United States Patent
Lorca Hernando

(10) Patent No.: US 9,425,870 B2
(45) Date of Patent: Aug. 23, 2016

(54) METHOD FOR PERFORMING MULTIPLE ACCESS IN WIRELESS OFDM CELLULAR SYSTEMS OVER MULTIPATH WIRELESS CHANNELS CONSIDERING BOTH SPACE AND FREQUENCY DOMAINS, BASE STATION AND COMPUTER PROGRAMS THEREOF

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/978,623

(22) Filed: Dec. 22, 2015

(65) Prior Publication Data

US 2016/0182196 A1    Jun. 23, 2016

(30) Foreign Application Priority Data

Dec. 23, 2014    (EP) .................................... 14382559

(51) Int. Cl.
*H04W 4/00*       (2009.01)
*H04L 1/02*       (2006.01)
*H04L 27/02*      (2006.01)
*H04B 7/02*       (2006.01)
(Continued)

(52) U.S. Cl.
CPC .......... *H04B 7/0413* (2013.01); *H01Q 21/061* (2013.01); *H04B 7/0408* (2013.01); *H04B 7/0452* (2013.01); *H04B 7/0617* (2013.01); *H04B 7/0626* (2013.01); *H04L 5/0003* (2013.01); *H04L 5/0094* (2013.01); *H04B 7/0456* (2013.01); *H04L 5/0007* (2013.01); *H04L 5/0053* (2013.01)

(58) Field of Classification Search
CPC   H04B 7/0413; H04B 7/0456; H04B 7/0617; H04B 7/0452; H04B 7/0626; H01Q 21/061; H04L 5/0003
See application file for complete search history.

(56) References Cited

FOREIGN PATENT DOCUMENTS

EP    2 806 576 A1    11/2014

OTHER PUBLICATIONS

Yu Han et al., "A Joint SDMA and Interference Suppression Multiuser Transmission Scheme for Millimeter-Wave Massive MIMO Systems", 2014 Sixth International Conference on Wireless Communications and Signal Processing (WCSP), Oct. 23, 2014, pp. 1-5, XP032710784.

(Continued)

*Primary Examiner* — Chieh M Fan
*Assistant Examiner* — Michelle M Koeth
(74) *Attorney, Agent, or Firm* — Sughrue Mion, PLLC

(57) ABSTRACT

Methods, a base station and computer programs for performing multiple access in wireless OFDM cellular systems over multipath wireless channels considering both space and frequency domains,
The base station 100 comprises a large number of antennas 103 in the form of a two-dimensional array and transmits a given number of signals to a number of users 106, so that each one receives its intended signal (or set of intended signals) without interference to/from the other users 106. The base station 100 includes a scheduler in space-time-frequency dimensions 101 as well as an orthogonal space-frequency processing technique 102 for addressing the users 106. The cellular scenario is assumed where the wireless channel 105 presents significant multipath, thereby resulting in multiple signal components being received by each user 106. Orthogonality of the beams is achieved upon transmission by properly discretizing the spatial domain, while inter-user interference is avoided by exciting only those beams that result in multipath components received by one single user 106.

14 Claims, 6 Drawing Sheets

(51) Int. Cl.
*H04B 7/04* (2006.01)
*H04B 7/06* (2006.01)
*H01Q 21/06* (2006.01)
*H04L 5/00* (2006.01)

(56) References Cited

OTHER PUBLICATIONS

European Search Report of EP 14382559.4 dated Jun. 2, 2015.

METHOD FOR PERFORMING MULTIPLE ACCESS IN WIRELESS OFDM CELLULAR SYSTEMS OVER MULTIPATH WIRELESS CHANNELS CONSIDERING BOTH SPACE AND FREQUENCY DOMAINS, BASE STATION AND COMPUTER PROGRAMS THEREOF

DESCRIPTION

1. Field of the Invention

The present invention generally relates to the field of multi-antenna technology in wireless cellular systems. In particular, the invention relates to methods, a base station and computer program for performing multiple access in wireless OFDM cellular systems over multipath wireless channels considering both space and frequency domains, in which the multi-antenna systems include massive antenna arrays at the base station.

2. Background of the Invention

Long-Term Evolution (LTE) is the next step in cellular 3G systems, which represents basically an evolution of current mobile communications standards, such as UMTS and GSM [1]. It is a 3GPP standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility) [2].

The use of multiple antenna technology (commonly known as Multiple-Input Multiple-Output, or MIMO) allows the exploitation of the spatial domain as another new dimension. This becomes essential in the search for higher spectral efficiencies. Multiple antennas can be used in a variety of ways, mainly based on three fundamental principles [3]:

Diversity gain. Use of the space-diversity provided by the multiple antennas to improve the robustness of the transmission against multipath fading.

Array gain. Concentration of energy in one or more given directions via precoding or beamforming.

Spatial multiplexing gain. Transmission of multiple signal streams to a single or multiple users on multiple spatial layers created by combinations of the available antennas.

These three principles are actually inter-related and one can expect array gains in addition to spatial multiplexing gains in particular MIMO techniques. Especially when dealing with multi-user MIMO, where multiple users are served in the same time-frequency resources by a combination of multiple spatial streams, users can benefit from the array gain achieved through beamforming for spatial separation of the multiple beams addressed for the different users.

So far, LTE-Advanced foresees the use of up to eight transmit antennas at the base stations. In order to address huge increases in the average cell spectral efficiency, Large-Scale Antenna Systems (LSAS), or massive MIMO systems, are currently being investigated as future extensions of LTE-Advanced beyond Release 12 [4]. These systems comprise several tens or even hundreds of low-power antennas, where the degrees of freedom in excess allow for a variety of signal processing possibilities in transmission and reception. These large MIMO systems are currently subject to intense research.

Some solutions are aimed at increasing spatial focusing of energy into specific directions, therefore addressing users more sharply such as the one disclosed in patent US-B2-8330642. So-called Time Reversal Beamforming (TRBF) focuses electromagnetic energy by means of probing the channel and time-reversing the received signals as described in patent application US-A1-2013/0028341. Other more traditional beamforming solutions involve tailoring the radiated pattern, so that beams oriented towards different users present minimum overlapping in order to minimize inter-user interference.

Another solution described in patent application EP-A1-2806576, of the same authors of present invention, delivers the appropriate signals to multiple users by creating a bi-dimensional space grid that ensures orthogonality, by which users can be orthogonally served through a combined space-frequency multiplexing method.

Current solutions in LTE-Advanced do foresee combinations of beamforming and spatial multiplexing for simultaneously addressing multiple users with different beamformers, based on proprietary precoding techniques [3]. However the limited number of antennas precludes addressing more than eight single-layer users at the same time-frequency resources. Massive MIMO systems cannot therefore exploit any extra antennas for simultaneously serving higher numbers of users.

Moreover, traditional beamforming approaches based on directing the radiated antenna pattern towards the intended users do not enable fully orthogonal separation of resources in space, as the beams will in general overlap to some extent. In order to limit the beams' side lobes (which are responsible for the interference), a large subset of the antenna array must be dedicated to each user. This dramatically reduces the maximum number of users that can be simultaneously served with a given number of antennas. At the same time, beamforming towards specific directions cannot prevent inter-user interference when significant multipath is present.

TRBF techniques suffer the drawback of requiring a two-steps procedure comprising a probe mechanism followed by a time-reversal signal generation, thus requiring computationally expensive time-domain processing. Given the short time intervals currently present in modern cellular systems (as in LTE, with scheduling intervals of only 1 ms), beamforming procedures should not involve costly operations in time and processing power.

The solution proposed in said EP patent application is only useful in the absence of any multipath component as it can destroy the orthogonality of the users. In realistic cellular communications scenarios, where multiple reflected, diffracted and scattered components are simultaneously received, beams directed to a given user can reach other users and thus interfere with them, effectively destroying the orthogonality.

More advanced solutions are therefore needed to achieve orthogonal multiplexing of users in space and frequency domains in the presence of multipath.

References:

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)

[2] http://www.3gpp.org/LTE-Advanced (retrieved on December 2014)

[3] S. Sesia, I. Toufik, M. Baker (editors), "LTE, the UMTS Long Term Evolution: From Theory to Practice" ($2^{nd}$ edition), John Wiley & Sons, 2011

[4] RP-121804, "New SID Proposal: Study on Full Dimension MIMO for LTE", 3GPP TSG RAN Meeting #58, Dec. 4-7, 2012

[5] COST 273 TD(02) 066, "Spatial Reciprocity of Uplink and Downlink Radio Channels in FDD Systems", Espoo, Finland, 2002

[6] Q. Gao, F. Qin, S. Sun, "Utilization of Channel Reciprocity in Advanced MIMO System", CHINACOM 2010 Aug. 25-27, Beijing, China

[7] S. K. Mohammed and E. G. Larsson, "Single-User Beamforming in Large-Scale MISO Systems with Per-Antenna Constant-Envelope Constraints: the Doughnut Channel", IEEE Transactions On Wireless Communications 11(11): 3992-4005 (2012)

[8] P. Chan, D. Lee, F. Tam, C. Lin, R. Cheng and V. Lau, "Angular-domain Channel Model and Channel Estimation for MIMO System", IEEE Global Communications Conference (GLOBECOM) 2008, Nov. 30, 2008-Dec. 4, 2008, New Orleans

[9] H. Yang and T. Marzetta, "Performance of Conjugate and Zero-Forcing Beamforming in Large-Scale Antenna Systems", IEEE Journal on Selected Areas in Communications, Vol. 31 (2), February 2013

Description of the Invention

Embodiments of the present invention address these and/or other needs by providing a combined space-frequency multiplexing technique for multi-antenna systems applicable to cellular scenarios with significant multipath that extends the orthogonal space-frequency division multiplexing approach proposed in patent application EP-A1-2806576, by making the necessary changes in realistic cellular scenarios in order to overcome the loss of orthogonality caused by multipath.

To that end, according to an embodiment there is provided a method for performing multiple access in wireless OFDM cellular systems over multipath wireless channels considering both space and frequency domains, wherein a base station equipped with a large number of antennas according to a two-dimensional rectangular array has complete knowledge of the channel characteristics between it and each one of a number of cell users, said rectangular array comprising $N_1$ antenna elements along one axis with a regular spacing $d_x$ and $N_2$ antenna elements along a perpendicular axis with a regular spacing $d_y$, and each one of the users being characterized by angles $(\theta, \phi)$ in a spherical coordinate system discretized through a grid spacing $(\Delta u, \Delta v)$ in the (u, v) domain to achieve orthogonality by letting $u=\sin(\theta)\cos(\phi)$, $v=\sin(\theta)\sin(\phi)$, $d_x=\lambda/(N_1 \Delta u)$, $d_y=\lambda/(N_2 \Delta v)$, $u_k=k\cdot\Delta u$ and $v_l=l\cdot\Delta v$, for $k=0,1,\ldots,N_1-1, l=0,1,\ldots,N_2-1$.

On contrary to the known proposals, the base station obtains, from known training or pilot signals transmitted by each one of the users, signals in the (u, v) domain by means of:

$$S_R[k, l, f] = \frac{1}{\sqrt{N_c N_1 N_2}} \sum_{t=0}^{N_c-1} \sum_{n=0}^{N_1-1} \sum_{m=0}^{N_2-1} A_R[n, m, t] \exp\left(-j\frac{2\pi}{N_c}ft\right)\exp\left(j\frac{2\pi}{N_1}nk\right)\exp\left(j\frac{2\pi}{N_2}ml\right)$$

where $A_R[n,m,t]$ denotes the time-domain signal received by antenna element (n, m), $N_c$ denotes the number of subcarriers in the frequency domain, and $S_R[k,l,f]$ denotes the frequency components of the received beam in (k, l) direction. Then, the base station estimates angular channel coefficients corresponding to each one of the users by means of using the following equation: $S_R[k,l,f]=H_i[k,l,f]\cdot \text{Pilot}_i[f]+N$, where $\text{Pilot}_i[f]$ denotes the a-priori known pilot/training signals transmitted by user i, $H_i[k,l,f]$ is the channel frequency response associated with user i in the direction (k, l), and N is a complex additive noise component, and estimates an angular profile $\phi_i$ characterizing each one of the users, said angular profile $\phi_i$ comprising a set of directions, or beams, (k, l) in the (u, v) domain for which the estimated angular channel coefficients $\hat{H}_i[k,l,f]$ are not zero: $\phi_i=\{(k_j,l_j), \forall_j=0,\ldots,N_1 N_2-1 \text{ such that } \hat{H}_i[k,l,f]\neq 0\}$.

Next, the base station discards, from said estimated angular profiles $\phi_i$, those beams belonging to two or more different angular profiles as they would cause inter-user interference, thereby leading to new angular profiles $\tilde{\phi}_i$ given by: $\tilde{\phi}_i=\{(k_j,l_j)\in\phi_i:(k_j,l_j)\notin\phi_{i'}\forall i'\neq i\}, i=0,\ldots,M'-1$, where M' denotes the number of different angular profiles after excluding beams causing inter-user interference, which coincides with the number of simultaneously addressable users. After that, the base station allocates powers to each of the beams contained in said angular profiles $\tilde{\phi}_i$, in such a way that the sum of powers of the beams in an angular profile does not exceed the power allocated to the corresponding user and finally calculates excitation coefficients for each one of said large number of antennas by means of:

$$A_T[n, m, f] = \sqrt{\frac{1}{N_1 N_2}} \sum_{(k,l)\in\tilde{\Phi}} P_T[k, l] \cdot \left( \sum_{(k',l')\in\tilde{\Phi}} U[k, l, k', l', f] S_T[k', l', f] \right) \times \exp\left(-j\frac{2\pi}{N_1}nk\right)\exp\left(-j\frac{2\pi}{N_2}ml\right)$$

where $A_T[n,m,f]$ is the excitation coefficient of antenna (n, m) in the frequency domain, $U[k,l,k',l',f]$ are the elements of a precoding matrix in the frequency domain, $P_T[k,l]$ is the transmit power allocated to the beam in the direction (k,l), $S_T[k,l,f]$ is the data corresponding to the direction (k, l) in the frequency domain, and $\tilde{\phi}$ denotes the superposition of the angular profiles of all the users with a number of elements, or beams, given by $$M \geq M'; \tilde{\Phi} \equiv \bigcup_{i=0}^{M'-1} \tilde{\Phi}_i.$$

In accordance with the above embodiment, the precoding matrix may be obtained by $U[k,l,k',l',f]=\hat{H}^{-1}[k,l,f]\delta[l-l']$, where $\hat{H}^{-1}[k,l,f]$ denotes the inverse of the estimated channel coefficients at directions (k, l) in the frequency domain, and $\delta[x]=1$ if $x=0$, $\delta[x]=0$ otherwise. Alternatively, the precoding matrix may be obtained by $$U[k, l, k', l', f] = \frac{\hat{H}^*[k, l, f]}{\|\hat{H}\|}\delta[k-k']\delta[l-l'],$$

where $\hat{H}^*[k,l,f]$ denotes the conjugate of the estimated channel coefficients at directions (k, l) in the frequency domain, and $\|\hat{H}\|$ is a norm defined by:

$$\|\hat{H}\| = \sqrt{\sum_{k,l \in \Phi} |\hat{H}[k, l, f]|^2}.$$

Moreover, according to a first alternative, the power allocated to the beam in direction (k, l) is given by:

$$P_T[k, l] = \frac{P_{T,i}}{N_{\Phi,i}}, \forall (k, l) \in \tilde{\Phi}_i, i = 0, \ldots, M' - 1,$$

where $N_{\phi,i}$ is the number of elements contained in $\tilde{\phi}_i$ and $P_{T,i}$ is the power allocated to user i. According to a second alternative, the power allocated to the beam in direction (k, l) may be given by:

$$P_T[k, l] = \frac{P_R[k, l]}{\sum_{(k,l) \in \tilde{\Phi}_i} P_R[k, l]} P_{T,i}, \forall (k, l) \in \tilde{\Phi}_i, i = 0, \ldots, M' - 1,$$

where $P_R[k,l]$ denotes the power associated with beam (k, l) as received by the user. According to a third alternative the power allocated to the beam in direction (k, l) is given by:

$$P_T[k, l] = \frac{P_R^{-1}[k, l]}{\sum_{(k,l) \in \tilde{\Phi}_i} P_R^{-1}[k, l]} P_{T,i}, \forall (k, l) \in \tilde{\Phi}_i, i = 0, \ldots, M' - 1.$$

In addition, the estimation of the angular channel coefficients is preferably given by $$\hat{H}_i[k, l, f] = \frac{\text{Pilot}_i[f]}{|\text{Pilot}_i[f]|^2 + 1/SNR} \times \frac{1}{\sqrt{N_1 N_2}}$$

$$\sum_{n=0}^{N_1-1} \sum_{m=0}^{N_2-1} A_R[n, m, f] \exp\left(j\frac{2\pi}{N_1}nk\right) \exp\left(j\frac{2\pi}{N_2}ml\right)$$

where SNR is the signal-to-noise ratio, and $A_R[n,m,f]$ denotes the frequency-domain signal received by antenna element (n, m):

$$A_R[n, m, f] = \frac{1}{\sqrt{N_c}} \sum_{t=0}^{N_c-1} A_R[n, m, t] \exp\left(-j\frac{2\pi}{N_c}ft\right).$$

According to another embodiment there is provided a method for performing multiple access in wireless OFDM cellular systems over multipath wireless channels considering both space and frequency domains, wherein a base station equipped with a large number of antennas according to a two-dimensional rectangular array has no information on the channel characteristics between it and each one of a number of cell users, said rectangular array comprising $N_1$ antenna elements along one axis with a regular spacing $d_x$ and $N_2$ antenna elements along a perpendicular axis with a regular spacing $d_y$, and each one of the users being characterized by angles $(\theta,\phi)$ in a spherical coordinate system discretized through a grid spacing $(\Delta u, \Delta v)$ in the (u, v) domain to achieve orthogonality by letting $u=\sin(\theta)\cos(\phi)$, $v=\sin(\theta)\sin(\phi)$, $d_x=\lambda/(N_1\Delta u)$, $d_y=\lambda/(N_2\Delta v)$, $u_k=k\cdot\Delta u$ and $v_l=l\cdot\Delta v$, for $k=0,1,\ldots,N_1-1$, $l=0,1,\ldots,N_2-1$.

On contrary of the known proposals, the base station obtains, from known training or pilot signals transmitted by each one of the users, signals in the (u, v) domain by:

$$S_R[k, l, f] = \frac{1}{\sqrt{N_c N_1 N_2}}$$

$$\sum_{t=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right),$$

where $A_R[n,m,t]$ denotes the time-domain signal received by antenna element (n, m), $N_c$, denotes the number of subcarriers in the frequency domain, and $S_R[k,l,f]$ denotes the frequency components of the received beam in (k, l) direction. Then, the base station estimates an angular profile $\phi_i$ characterizing each one of the users, said angular profile $\phi_i$ comprising a set of directions, or beams, (k, l) in the (u, v) domain for which received powers from each one of the users are not zero: $\phi_i = \{(k_j, l_j), \forall j=0, \ldots, N_1 N_2 - 1 \text{ such that non-null signal is received by user i}\}$.

After that, the base station discards, from said estimated angular profiles $\phi_i$, those beams belonging to two or more different angular profiles as they would cause inter-user interference, thereby leading to new angular profiles $\tilde{\phi}_i$ given by: $\tilde{\phi}_i = \{(k_j, l_j) \in \phi_i, \forall i' \neq i\}, i=0, \ldots, M'-1$, where M' denotes the number of different angular profiles after excluding beams causing inter-user interference, which coincides with the number of simultaneously addressable users. Next, the base station allocates powers to each of the beams contained in the said angular profiles $\tilde{\phi}_i$, in such a way that the sum of powers of the beams in an angular profile does not exceed the power allocated to the corresponding user, and finally calculates excitation coefficients for each one of said large number of antennas by:

$$A_T[n, m, f] =$$
$$\sqrt{\frac{1}{N_1 N_2}} \sum_{(k,l) \in \tilde{\Phi}} P_T[k, l] \cdot S_T[k, l, f] \exp\left(-j\frac{2\pi}{N_1}nk\right) \exp\left(-j\frac{2\pi}{N_2}ml\right),$$

where $A_T[n,m,f]$ is the excitation coefficient of antenna (n, m) in the frequency domain, $P_T[k,l]$ is the transmit power allocated to the beam in the direction (k, l), $S_T[k,l,f]$ is the data corresponding to the direction (k, l) in the frequency domain, and $\tilde{\phi}$ denotes the superposition of the angular profiles of all the users with a number of elements, or beams, given by $$M \geq M' : \tilde{\Phi} \equiv \bigcup_{i=0}^{M'-1} \tilde{\Phi}_i.$$

In accordance with this particular embodiment the power allocated to user i may be given by $$P_T[k, l] = \frac{P_{T,i}}{N_{\Phi,i}}, \forall (k, l) \in \tilde{\Phi}_i, i = 0, \ldots, M' - 1,$$

where $N_{\phi,i}$ is the number of elements contained in $\tilde{\phi}_i$ and $P_{T,i}$ is the power allocated to user i.

According to the invention, the signals intended for directions (k, l) in the (u, v) domain are equal to the signals intended for the user characterized by the angular profile $\tilde{\phi}_i$ which contains that direction $S_T[k,l,f]=S_i[f]; \forall (k,l) \in \tilde{\phi}_i$, i=0,1, ..., M'−1, where $S_i[f]$ is the signal for user i in the frequency domain.

In addition, the operating frequencies for uplink and downlink directions are in general different, and the angles (θ,φ) are discretized by means of different grids (Δu,Δv) in uplink and downlink, according to $$\Delta u_{UL} = \frac{\lambda_{UL}}{d_x N_1}, \Delta u_{DL} = \frac{\lambda_{DL}}{d_x N_1};$$

and $$\Delta v_{UL} = \frac{\lambda_{UL}}{d_y N_2}, \Delta v_{DL} = \frac{\lambda_{DL}}{d_y N_2};$$

where $\lambda_{UL}$ denotes the wavelength in uplink centre frequency, $\lambda_{DL}$ denotes the wavelength in downlink centre frequency, ($\Delta u_{UL}$, $\Delta v_{UL}$) is the grid in uplink and ($\Delta u_{DL}$, $\Delta v_{DL}$) is the grid in downlink.

Other embodiments of the invention that are disclosed herein include a base station configured to implement one or more aspects of the disclosed methods, as well as software programs to perform the methods embodiments steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention allows for simultaneously addressing a number of users in the same time and frequency resources in the presence of multipath, thereby increasing cellular capacity. On contrary to prior art solutions, this invention is capable of avoiding inter-user interference even in the absence of detailed channel knowledge at the transmit side. Angles of departure that lead to significant inter-user interference can be identified and further avoided at the transmit side even with no channel reciprocity assumptions. When channel reciprocity can be assumed a channel estimation procedure is provided where channel coefficients are characterized in the angular domain, and appropriate precoding and power allocation strategies can be applied so as to maximize the received signals while avoiding inter-user interference. Closed-form expressions for obtaining the antenna excitations are provided in both cases.

Moreover, present invention does not require accurate characterization of the angular channel characteristics at both the transmitter and receiver. Only the transmit directions enter into consideration when estimating the channel transfer characteristics, which would include the effects of the receiver's pattern as well as the multiple reflections from the surrounding objects.

Also, power allocation strategies are not based on the allocated power for each antenna, but rather on the allocated power per each of the angular directions. Beams can be properly excited with different transmit powers, or even with null power in order to avoid inter-user interference.

Operation in FDD systems, with different centre frequencies in uplink and downlink, is also possible by considering different grid spacing in both directions. Practical systems will exhibit minor differences in the grids because of the relatively small frequency separation between uplink and downlink, thereby leading to very similar beam characteristics in both directions.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION AND OF SEVERAL EMBODIMENTS

Figure 1:
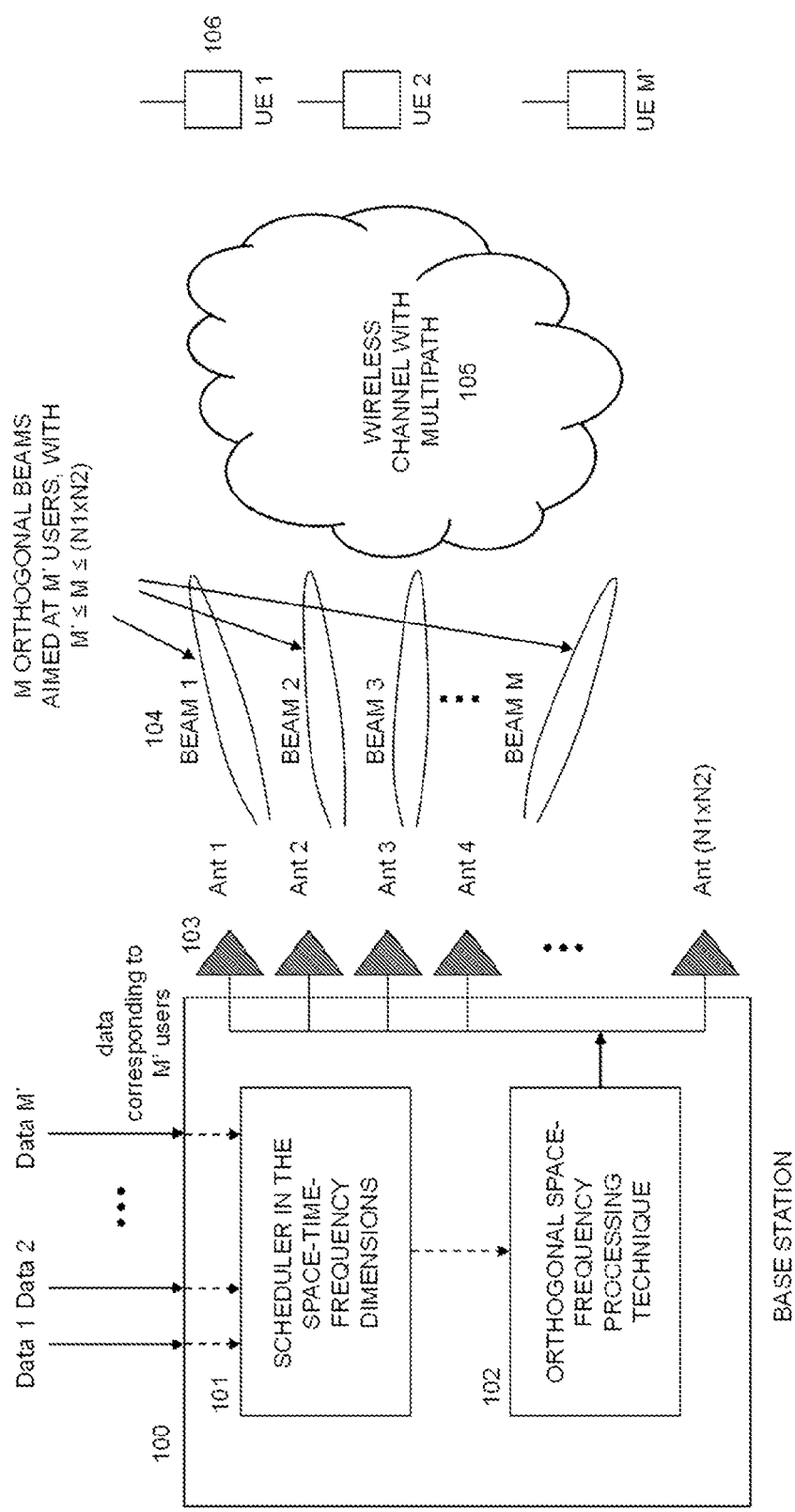
FIG. 1 is an illustration of an embodiment of the proposed invention for a simultaneous multiplexing of users in the space and frequency domains in the presence of multipath.

Present invention allows simultaneous multiplexing of users 106 in the space and frequency domains in the presence of multipath. Without loss of generality, in what follows it is considered that the transmitter is a base station 100 having multiple antennas 103, and the users 106 have single-antenna receivers. The wireless links between transmitter 100 and receivers 106 are referred to as downlink channels. Application of the ideas presented in this invention to receivers with more than one antenna, and to uplink channels, will be straightforward to people skilled in the art.

According to FIG. 1 a base station 100 comprising a large number of antennas 103 (in the form of a two-dimensional array) is aimed at transmitting a given number of signals to a set of M' users 106, so that each one receives its intended signal (or set of intended signals) without interference to/from the other users. The base station 100 includes a scheduler in space-time-frequency dimensions 101 as well as an orthogonal space-frequency processing technique 102 for addressing the users 106. The base station 100 transmits a set of M orthogonal beams 104 intended to be received by M' users 106, where M'≤M≤$N_1 \times N_2$.

A cellular scenario is assumed where the wireless channel 105 presents significant multipath, thereby resulting in multiple signal components being received by each user 106. Orthogonality of the beams is achieved upon transmission by properly discretizing the spatial domain, while inter-user interference is avoided by exciting only those beams that result in multipath components received by one single user 106. The base station 100 will thus exclude those angular directions in space that result in angular components being received by more than one user 106. By direct examination of the signals received from the users 106 at the reverse (uplink) channel, the base station 100 can detect the angular directions of their signals and then exclude those beams which are common to more than one user 106. In addition, when the base station 100 has full knowledge of the downlink channel characteristics of each of the users 106, precoding and power allocation strategies can be applied so as to maximize the received signal-to-noise ratio (SNR) of the users 106.

Examination of the angles of arrival of the uplink signals can rely on periodic transmissions of orthogonal signatures or identification sequences by the users 106. The base station 100 can detect the received uplink beams corresponding to each of the users 106, and then avoid inter-user interference in the downlink by exciting only those beams not shared by several users 106. The higher the number of multipath components, the higher the chance that two users 106 can interfere with each other.

It is to note that the above method can operate both in Frequency Division Duplex (FDD) and Time Division Duplex (TDD) systems. Even if reciprocity of the channel does not hold for uplink and downlink in FDD systems, the directions of arrival and departure are strongly correlated with minor corrections needed due to the different centre frequencies in use [5] [6]. This is in contrast to classical beamforming solutions where selection of the optimal beamforming weights relies on complete knowledge of the channel and can therefore be used only in TDD mode, unless accurate channel state information is fed back from the users in FDD (which is unpractical). Given that each user 106 will receive a number of multipath components ideally containing the desired signal without inter-user interference, users 106 only have to compensate the effects of the resulting frequency-selective channel. To help this, Orthogonal Frequency Division Multiplexing (OFDM) allows frequency-domain equalization of the signals aided by pilot or training signals interspersed with user data, provided that multipaths are received within the length of the cyclic prefix [3].

If complete channel state information is also known at the base station 100 side (as in TDD), the base station 100 can apply specialized precoding and power allocation strategies such as Maximum Ratio Transmission (MRT) or Zero Forcing (ZF), so as to maximize the received SNR (or minimize the overall transmit power for the same SNR) [10]. Channel state information in prior art solutions would comprise the channel components between all users 106 and antenna 103 elements. However, in contrast with prior art solutions, in present invention only the angular channel components corresponding to the transmit directions in space not creating inter-user interference need to be estimated. This information can then be acquired at the base station 100 and applied as part of the beamforming and power allocation strategies, thus maximizing the received SNR for the active users 106.

Figure 2:
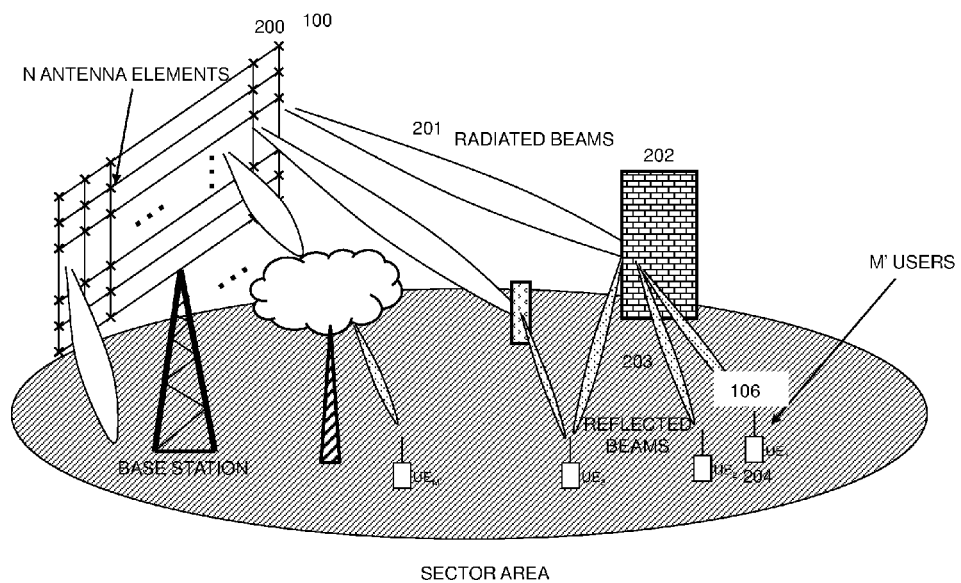
FIG. 2 is an illustration of a cellular scenario characterized by significant multipath.

With reference to FIG. 2 it is illustrated a cellular scenario characterized by significant multipath. A cell in a wireless cellular system comprises a base station 100 equipped with a large number of identical transmit antennas 103, and M' users 106 (each having a single antenna) willing to simultaneously transmit/receive at certain time-frequency resources allocated by the base station 100. Without loss of generality it can be assumed that the base station 100 is equipped with a two-dimensional antenna array with $N_1 \times N_2$ antenna elements. It is also assumed that Orthogonal Frequency-Division Multiplexing (OFDM) is employed for the allocation of users 106 in time and frequency. The base station 100 transmits a set of M orthogonal beams 201 intended for the M' users 106. The cellular scenario is characterized by significant multipath caused by the surrounding objects 202, and the users 106 receive multiple signal components 203 as a result of the combined effects of reflection, refraction, diffraction and scattering. Extension of the proposed ideas to other base station configurations, and to more than one receive antenna will be straightforward for those people skilled in the art.

Orthogonal Space-Frequency Multiple Access in the Presence of Multipath

According to patent application EP-A1-2806576, a space-frequency signal processing technique can be applied whereby the combined reception of the signals coming from all transmit antennas 103 will yield the desired results at particular directions in a 3D scenario. A grid in the (u, v) domain is defined, where the coordinates (u, v) are the directional cosines related to the elevation and azimuth angles $(\theta, \phi)$:

$$u = \sin(\theta)\cos(\phi)$$

$$v = \sin(\theta)\sin(\phi).$$

A sector area is completely covered by a set of $N_1 \times N_2$ discrete points given by:

$$u_k = k \cdot \Delta u; k = 0, 1, \ldots, N_1 - 1$$

$$v_l = l \cdot \Delta v; l = 0, 1, \ldots, N_2 - 1,$$

where the sampling periods $\Delta u, \Delta v$ represent the desired granularity in the spatial domain and are related to the antenna 103 spacing in both dimensions of the array $d_x, d_y$ in order to achieve orthogonality of the users 106:

$$d_x = \frac{\lambda}{N_1 \Delta u}$$

$$d_y = \frac{\lambda}{N_2 \Delta v}$$

Figure 3:
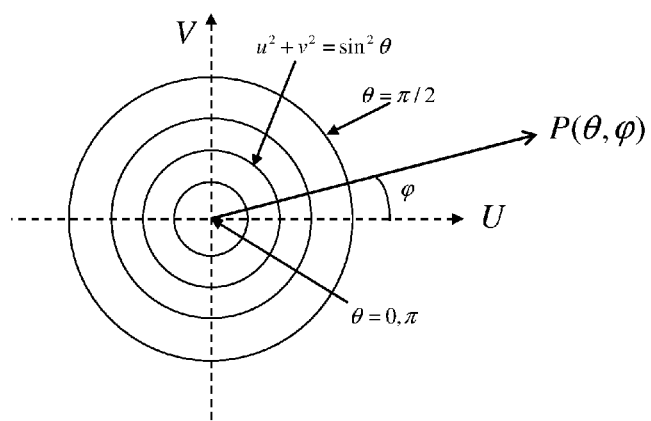
FIG. 3 illustrates a visible region in the (u, v) domain.

It is to note that the (u, v) domain corresponds to the projection of the points in a spherical surface of radius unity over the (x, y) plane, i.e. the (u, v) coordinates are the (x, y) coordinates of the points in a spherical surface of unitary radius (FIG. 3).

In FDD systems, with different centre frequencies in uplink and downlink, it would be possible to define different grids for the angles $(\theta, \phi)$ in uplink and downlink according to the expressions:

$$\Delta u_{UL} = \frac{\lambda_{UL}}{d_x N_1}, \quad \Delta u_{DL} = \frac{\lambda_{DL}}{d_x N_1}$$

$$\Delta v_{UL} = \frac{\lambda_{UL}}{d_y N_2}, \quad \Delta v_{DL} = \frac{\lambda_{DL}}{d_y N_2}$$

where $\lambda_{UL}$ denotes the wavelength in uplink centre frequency, $\lambda_{DL}$ denotes the wavelength in downlink centre frequency, $(\Delta u_{UL}, \Delta v_{UL})$ is the grid in uplink and $(\Delta u_{DL}, \Delta v_{DL})$ is the grid in downlink.

The frequency-domain OFDM transmit signal $A_T[n,m,f]$ corresponding to each antenna element (n, m) will be obtained by means of the following expression, where $N_c$ denotes the number of subcarriers in the frequency domain and $P_T$ is the overall transmit power of the array, as described in patent application EP-A1-2806576:

$$A_T[n, m, f] = \sqrt{\frac{P_T}{N_1 N_2}} \sum_{k=0}^{N_1-1} \sum_{l=0}^{N_2-1} S_T[k, l, f] \exp\left(-j\frac{2\pi}{N_1}nk\right)\exp\left(-j\frac{2\pi}{N_2}ml\right),$$

$$\text{with } \begin{cases} n = 0, \ldots, N_1 - 1 \\ m = 0, \ldots, N_2 - 1 \\ f = 0, \ldots, N_c - 1 \end{cases}$$

The information to be sent to each user 106 is constructed as follows:

$$S_T[k, l, f] = \begin{cases} S_i[f]; \forall (k, l) \in \{(k_i, l_i), i = 0, 1, \ldots, M-1\} \\ 0; \text{otherwise} \end{cases},$$

where $S_i[f]$ are the normalized (unit power) complex baseband signals corresponding to the beam i, and the beams are located by the angular coordinates $(k_i,l_i)$, i=0,1, ..., M−1. When no inter-beam interference is assumed then one can identify beams with users in a one-to-one correspondence. This assumption will in general not be true for multipath scenarios. In what follows the index i will only refer to users.

For detection of the uplink signals, after receiving the time-domain signals $A_R[n,m,t]$ at antenna elements (n, m) the frequency contents of each user 106 can be obtained by means of the following expression, as described in patent application EP-A1-2806576:

$$S_R[k, l, f] = \frac{1}{\sqrt{N_c N_1 N_2}}$$

$$\sum_{t=0}^{N_c-1} \sum_{n=0}^{N_1-1} \sum_{m=0}^{N_2-1} A_R[n, m, t] \exp\left(-j\frac{2\pi}{N_c}ft\right)\exp\left(j\frac{2\pi}{N_1}nk\right)\exp\left(j\frac{2\pi}{N_2}ml\right).$$

The above described procedure is only valid in the absence of multipath, because users 106 are assumed to receive the beams only in one direction in space. In this condition inter-user interference would only appear if the users' 106 positions are not perfectly estimated or do not correspond exactly with the grid positions in the (u, v) space. However, multipath destroys orthogonality because users 106 will in general receive multiple delayed copies of the signals (with appropriate amplitudes and phases) after reflection, diffraction or scattering from surrounding objects. Inter-user interference will appear if a beam intended for a particular user 106 is also received by a different one, as usually happens in cellular scenarios because of the presence of nearby obstacles.

In order to overcome this drawback, it is first assumed that there is one single user 106 to be addressed, i.e. there is no inter-user interference. There will be no precise (k, l) coordinates characterizing the user location, and all beams can in principle reach the user 106 by reflection, refraction, diffraction and scattering effects. For each direction (k, l) and antenna element (n, m), the corresponding received component at user i could be theoretically characterized by an angular channel transfer function $H_i[k,l,n,m,f]$ that represents the effects of the channel on the rays coming from antenna (n, m) in the transmit direction (k, l), including the relative phases of the different paths and the multiple components arriving at the receiver by reflection, diffraction and scattering.

Figure 4:
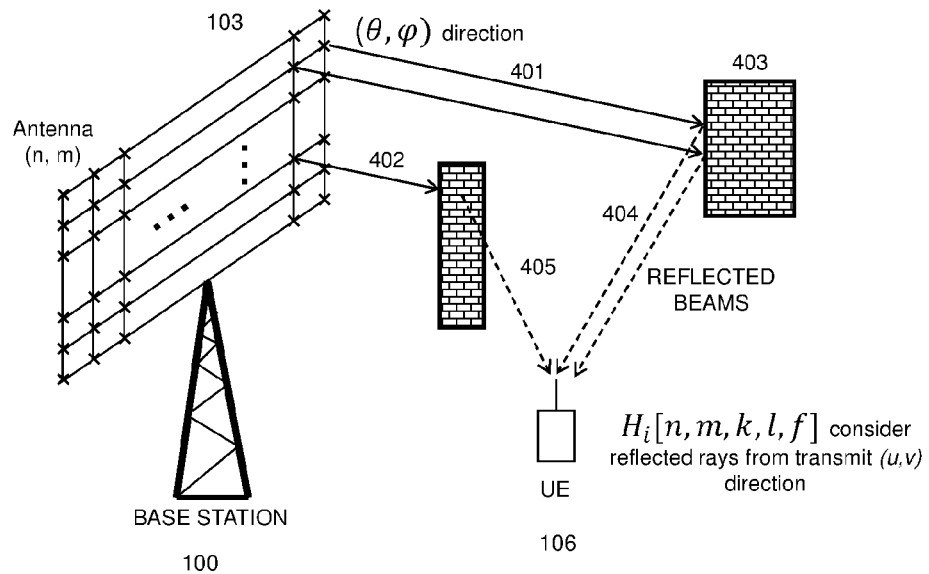
FIG. 4 illustrates a theoretical angular channel transfer function from antenna element (n, m) in the direction (k, l).

FIG. 4 illustrates the angular channel transfer function definition. Each antenna element 103 transmits in all directions, and considering an isolated direction (θ,φ) characterized by coordinates (k, l) the transmit rays 401, 402 will encounter several obstacles 403 on their way. Reflected beams 404, 405 will arrive at the receiver 106 with different amplitudes and phases thereby leading to different channel coefficients $H_i[k,l,n,m,f]$. It is important to emphasize that (k, l) represents a transmit direction (not a received direction): a given transmit signal at (k, l) direction can eventually suffer from multiple reflections and will thus be received at multiple directions of arrival.

The angular channel transfer function $H_i[k,l,n,m,f]$ would be very difficult to measure in practice because each antenna 103 element radiates in all directions in space and each direction should be ideally isolated prior to obtaining the channel coefficients.

It can be defined the angular profile of user i, $\phi_i$, as the set of transmit directions in the (u, v) grid resulting in non-zero received powers at user i: $\phi_i = \{(k_j,l_j), \forall j=0, \ldots, N_1 N_2-1$ such that non-null signal is received by user i$\}$ On contrary to prior art, $\phi_i$ contains the directions at the transmit side that lead to appreciable signal at the receive side. Prior art approaches usually consider the angular spectrum at both transmit and receive sides when characterizing the angular channel response [8], and this requires accurate channel sensing capabilities at the receiver which are not possible with only one antenna. The present invention simplifies this point by restricting multipath characterization at the transmit side where high angular resolution is available.

Under antenna excitations in the frequency domain $A_T[n, m, f]$, given by $$A_T[n, m, f] = \frac{1}{\sqrt{N_c}} \sum_{t=0}^{N_c-1} A_T[n, m, t] \exp\left(-j\frac{2\pi}{N_c}ft\right),$$

the received signal at user i will comprise the sum of all multipath components corresponding to the directions contained in $\phi_i$, further affected by channel coefficients $H_i[k,l,n,m,f]$:

$$S_{R,i}[f] = \frac{1}{\sqrt{N_1 N_2}}$$

$$\sum_{(k,l)\in\Phi_i} \sum_{n=0}^{N_1-1} \sum_{m=0}^{N_2-1} A_T[n, m, f] H_i[k, l, n, m, f] \exp\left(j\frac{2\pi}{N_1}nk\right)\exp\left(j\frac{2\pi}{N_2}ml\right).$$

Figure 5:
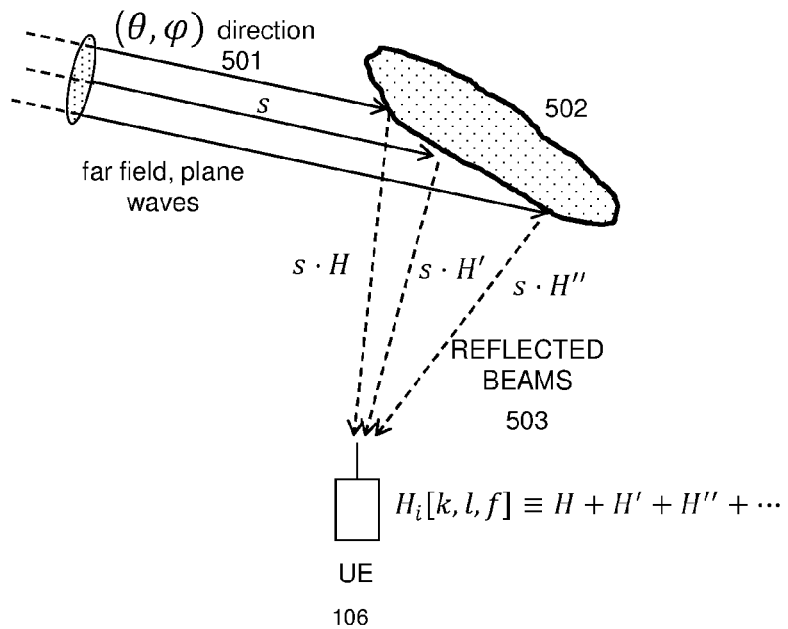
FIG. 5 illustrates an approximation of the angular channel response in the far field regime.

Obtaining the required antenna excitations from the above equation for a given user data is not straightforward. On the other hand, knowledge of the channel coefficients $H_i[k,l,n,m,f]$ at the transmitter would not be easy as the users cannot in principle discriminate the transmit directions corresponding to each of the received components. However, in the far-field regime, it is reasonable to consider that the combined signal at a given direction of space undergoes an effective channel response that is independent of (n, m) and includes the effects of the reflections on surrounding objects, the different distances covered by the rays and the receiver antenna patterns: $H_i[k,l,n,m,f] \approx H_i[k,l,f]$. This is illustrated in FIG. 5. For each direction (θ,φ) the plane waves 501 coming from the antenna array 103 reflect into obstacles 502, and the magnitude in each ray s is multiplied by different channel coefficients H, H', H"... etc. leading to multiple reflected rays 503 arriving at the user 106. These "elementary" channel components include the effects of the different propagation distances and the multiple reflection, diffraction and scattering phenomena. The received signal will therefore comprise the superposition of multiple components that lead to a combined effective channel response $H_i[k,l,f]$, which only depend on the angular directions (k, l) and can be estimated at the transmit side. The expression for the received signal will in this case simplify to:

$$S_{R,i}[f] \cong \frac{1}{\sqrt{N_1 N_2}} \sum_{(k,l)\in\Phi_i} H_i[k,l,f] \sum_{n=0}^{N_1-1}\sum_{m=0}^{N_2-1} A_T[n,m,f]\exp\left(j\frac{2\pi}{N_1}nk\right)\exp\left(j\frac{2\pi}{N_2}ml\right) = \sum_{(k,l)\in\Phi_i} H_i[k,l,f]\cdot DFT^{-1}_{n,m}\{A_T[n,m,f]\}$$

where $DFT_{n,m}^{-1}$ denotes the inverse Discrete Fourier Transform in the (n, m) coordinates.

The received signal thus comprises a number of multipath components at given directions in space, each comprising a complex channel coefficient $H_i[k,l,f]$ times an inverse DFT of the antenna excitations in the (n, m) coordinates. The channel coefficients represent an effective channel response comprising the multiple reflections, diffractions and relative phase offsets experienced by the transmit signals at (k, l) direction leading to multiple received paths.

Estimation of the Channel Coefficients and Angular Profiles

Knowledge of the channel coefficients at the transmit side is advantageous for application of precoding techniques that try to maximize the received SNR at the users 106. The channel coefficients can be estimated at the transmit side in TDD mode (exploiting channel reciprocity) by means of transmitting, by the users 106, known training or pilot signals at the uplink channel, and decomposing the received signals by the base station 100 in search for their constituent beams. The number of non-null multipath components experienced by the users 106 for each transmit direction will be equal to the signals received by the base station 100 at (k, l) directions with non-zero power. $H_i[k,l,f]$ can therefore be obtained from the following equation: $DFT_{n,m}^{-1}\{A_R[n,m,f]\}=H_i[k,l,f]\cdot Pilot_i[f]+N$, where $Pilot_i[f]$ denotes the a-priori known pilot/training signal transmitted by user i; $H_i[k,l,f]$ is the channel frequency response associated with user i in the direction (k, l); $A_R[n,m,f]$ represent the signals received at antenna elements (n, m) in the frequency domain; N is a complex additive noise component; and the inverse DFT is defined by:

$$DFT^{-1}_{n,m}\{A_R[n,m,f]\} \equiv \frac{1}{\sqrt{N_1 N_2}}\sum_{n=0}^{N_1-1}\sum_{m=0}^{N_2-1} A_R[n,m,f]\exp\left(j\frac{2\pi}{N_1}nk\right)\exp\left(j\frac{2\pi}{N_2}ml\right).$$

Estimation of $H_i[k,l,f]$ can be performed using any suitable estimation technique (such as e.g. Wiener filtering or Linear Minimum Mean Square Error (LMMSE), among others), without departure from the ideas proposed in this invention. As an example, LMMSE estimation under complex Gaussian noise would lead to the following expression:

$$\hat{H}_i[k,l,f] = \frac{Pilot_i[f]}{|Pilot_i[f]|^2 + 1/SNR} DFT^{-1}_{n,m}\{A_R[n,m,f]\}.$$

Each user 106 would transmit a different (ideally orthogonal) pilot/training signal, so that the base station 100 can discriminate each the channel components corresponding to each of the users 106. The amplitude factors resulting from the difference in powers between the transmitted and received signals should be removed prior to obtaining $\hat{H}_i[k,l,f]$, e.g. by normalization of $A_R[n,m,f]$.

Even if channel reciprocity cannot be assumed (e.g. in FDD mode), the angular profiles $\phi_i$ can be estimated at transmission by means of the same procedure. $\phi_i$ contains the directions (k, l) that lead to appreciable signal magnitude at the receiver and can thus be estimated at the transmitter from the uplink pilot/training signals. The (u, v) space in uplink direction will be slightly different to that in downlink because of the different centre frequencies in uplink and downlink, that lead to different values of $\Delta u, \Delta v$ and therefore different beam grids. This difference should be taken into account when analysing the uplink directions of arrival and translating them back to downlink directions of departure in FDD mode.

Usual channels exhibit a large number of multipath components at all directions in space, but only few of them have significant influence. In order to retain the most significant components it is possible to discard those directions for which the received powers are below a given threshold (either absolute or relative to the strongest path). The resulting paths characterize the angular profile of user i at the transmit side, and can then be further exploited to avoid inter-user interference.

Inter-User Interference

Figure 6:
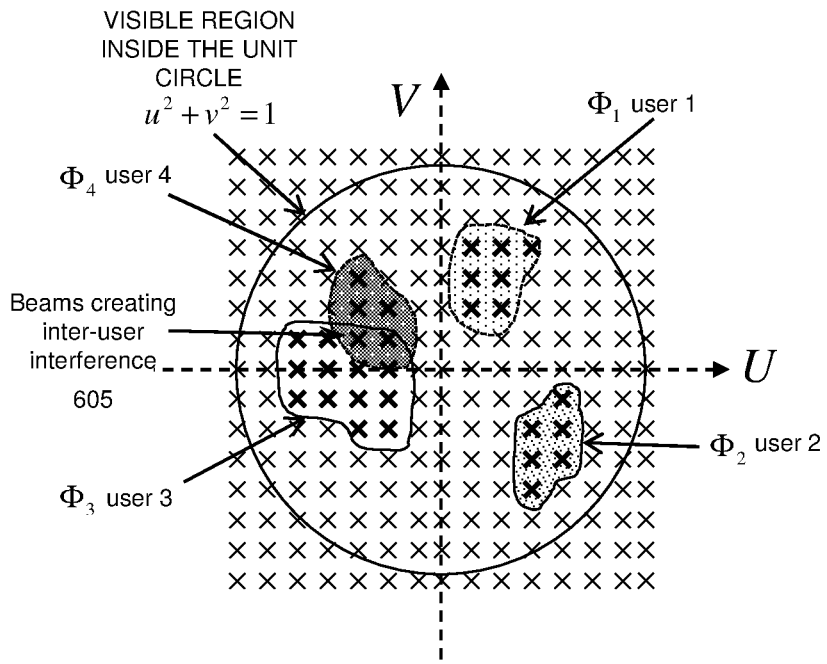
FIG. 6 is an illustration of exemplary angular profiles of different users showing beams causing inter-user interference.

When multiple users 106 are present in the system, chances are that inter-user interference appears because of multipath. After obtaining the angular profiles $\phi_i$ of all active users 106 in the system, it is possible to derive which beams are shared by several users 106, i.e. which beams can cause inter-user interference. FIG. 6 shows an exemplary diagram in the (u, v) plane showing possible angular profiles corresponding to several users 106. Each set of directions forms a cluster that characterizes a given user 106. If any discrete point (k, l) is shared by two different clusters and has significant power then interference will appear. Beams corresponding to user 1, and user 2, are isolated and do not lead to interference. However the beams for user 3, and user 4, have two beams in common 605, thereby appearing inter-user interference between users 3 and 4.

The transmitter must therefore avoid the excitation of shared beams, which can be possible even if no actual channel coefficients are known, e.g. in FDD mode. Inter-user interference will be kept to a minimum if new sets of directions $\{\tilde{\phi}_i, i=0, \ldots, M'-1\}$ are defined after excluding those beams from $\phi_i$ which are shared by two or more users 106: $\tilde{\phi}_i = \{(k_j,l_j) \in \phi_i : (k_j,l_j) \notin \phi_{i'} \forall i' \neq i\}$, $i=0, \ldots, M'-1$, where M' denotes the number of different resulting clusters. The combined set of all directions, excluding those that lead to inter-user interference, is therefore:

$$\tilde{\Phi} \equiv \bigcup_{i=0}^{M'-1} \tilde{\Phi}_i.$$

Figure 7:
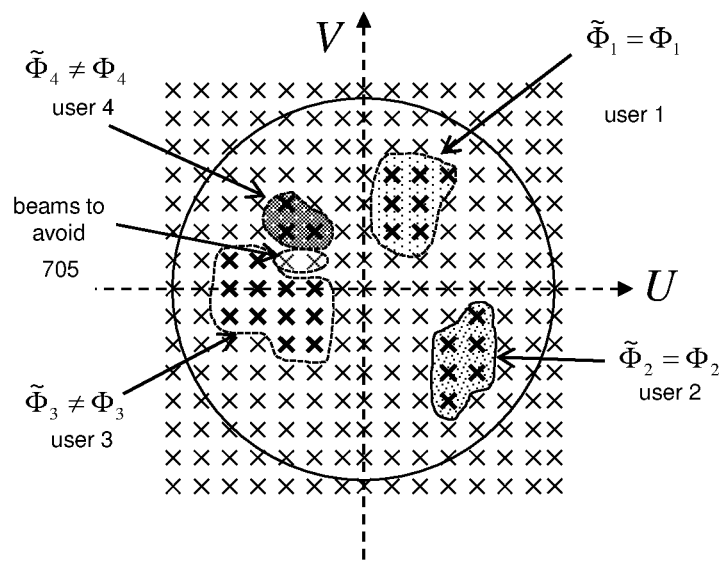
FIG. 7 illustrates some exemplary angular profiles where inter-user interference is avoided by not exciting common beams.

The number of beams within $\tilde{\phi}$ will be equal to M. The number of simultaneously addressable users 106 will be equal to the number of clusters M'≤M. If the beams of one user 106 are completely included within those of another user 106 then the former will have to be scheduled in orthogonal resources (i.e. in different time or frequency resources). FIG. 7 illustrates how beams common to user 3 and user 4, are avoided. The angular profiles for user 3, and user 4, are now disjoint, while the angular profiles for user 1, and user 2, remain unchanged.

Inter-user interference will change dynamically according to the environmental conditions and user mobility. Periodic examination of the uplink signals should therefore allow to update $\tilde{\phi}_i$ and hence the beams potentially causing inter-user interference.

It is to note that the actual powers of the received beams may not be equal in uplink and downlink directions if reciprocity cannot be assumed, e.g. in FDD mode. Actual channel coefficients are frequency-dependant and the superposition of multiple reflected rays can result in different signal powers for the uplink and downlink directions. Therefore, in order to discard beams leading to significant inter-user interference it would be important to set a conservative power threshold with sufficiently low value, and to integrate powers over a time larger than the channel coherence time, in such a way that fast random channel variations can be smoothed out.

Power Allocation Strategies

Users 106 in the system can be allocated different powers depending on the overall power control strategy of the system. Such power control is outside the scope of the present invention, however it can be assumed that the transmit power for user i, $P_{T,i}$ is a priori known by the system. If the angular profile for a given user $\tilde{\phi}_i$ contains more than one direction in the (u, v) domain, then the same information will be conveyed by those beams and different power allocation strategies can be devised:

Allocate the same power to all the beams, namely the power allocated to the user 106 divided by the number of active beams:

$$P_T[k,l] = \frac{P_{T,i}}{N_{\Phi,i}}, \forall\, (k,l) \in \tilde{\Phi}_i, i = 0, \ldots, M'-1$$

where $P_T[k,l]$ is the power allocated to the beam in the direction (k, l), and $N_{\Phi,i}$ is the number of elements contained in $\tilde{\phi}_i$. This strategy does not favour specific beams against others. The receiver will naturally combine the multipaths provided that the maximum delay spread is within the length of the cyclic prefix.

Allocate higher power for the beams with higher received power, and vice versa:

$$P_T[k,l] = \frac{P_R[k,l]}{\sum_{(k,l)\in\tilde{\Phi}_i} P_R[k,l]} P_{T,i}, \forall\, (k,l) \in \tilde{\Phi}_i, i = 0, \ldots, M'-1,$$

where $P_R[k,l]$ denotes the power associated with beam (k, l) as received by the user 106. This strategy tries to reinforce beams with good qualities at the cost of minimizing the power of those with bad reception characteristics.

Allocate higher power for the weakest beams, and vice versa:

$$P_T[k,l] = \frac{P_R^{-1}[k,l]}{\sum_{(k,l)\in\tilde{\Phi}_i} P_R^{-1}[k,l]} P_{T,i}, \forall\, (k,l) \in \tilde{\Phi}_i, i = 0, \ldots, M'-1.$$

This strategy tries to equalize the received powers of all the beams towards a given user 106.

It is to note that the second and third strategies above need to estimate $P_R[k,l]$ at the transmit side by exploiting channel reciprocity in TDD mode. All three strategies provide a transmit power for each specific direction (k, l) that is finally translated to proper excitation coefficients $A_T[n,m,f]$ for each antenna (n, m). Other power allocation strategies can be devised by people skilled in the art without departure from the ideas proposed in this invention.

Excitation of Antenna Elements in the Absence of Channel Information

When the transmitter does not have an estimation of the channel coefficients $\hat{H}_i[k,l,f]$ and the received powers $P_R[k,l]$, excitation coefficients for the antenna elements can still be obtained from a double DFT of the user signals extended over $\tilde{\phi}$ without considering any precoding operation:

$$A_T[n,m,f] = \sqrt{\frac{1}{N_1 N_2}} \sum_{(k,l)\in\tilde{\Phi}} P_T[k,l] \cdot S_T[k,l,f] \exp\left(-j\frac{2\pi}{N_1}nk\right)\exp\left(-j\frac{2\pi}{N_2}ml\right),$$

where $S_T[k,l,f]$ is the data corresponding to the direction (k, l) in the frequency domain, which can be made equal to the signal intended for the user characterized by the angular profile $\tilde{\phi}_i$ which contains that direction: $S_T[k,l,f]=S_i[f]; \forall (k,l)\in\tilde{\phi}_i=0,1,\ldots,M'-1$, where $S_i[f]$ is the signal for user i in the frequency domain.

In the above equation the transmit powers cannot rely on any a-priori channel knowledge, therefore power could be uniformly allocated over the active beams:

$$P_T[k,l] = \frac{P_{T,i}}{N_{\Phi,i}}, \forall\, (k,l) \in \tilde{\Phi}_i, i = 0, \ldots, M'-1.$$

Users 106 will therefore receive a set of beams with ideally no (or very limited) inter-user interference. The effects of multipath are seen as a non-flat channel response in the frequency domain similar to the single-antenna case, and users 106 can easily equalize the signals prior to detection by means of any suitable equalization technique (like Zero Forcing, ZF, or Linear Minimum Mean Square Error, LMMSE, among others).

Precoding Techniques Under Knowledge of Channel Information

When the transmitter has knowledge of the estimated channel coefficients $\hat{H}_i[k,l,f]$ characterizing a user i, additional precoding can be applied upon transmission for improved detection. The general expression of the excitation coefficients for each of the antennas 103 would be obtained from the following equation:

$$A_T[n, m, f] = \sqrt{\frac{1}{N_1 N_2}} \sum_{(k,l) \in \Phi} P_T[k, l] \cdot \left( \sum_{(k',l') \in \Phi} U[k, l, k', l', f] S_T[k', l', f] \right) \times \exp\left(-j\frac{2\pi}{N_1}nk\right) \exp\left(-j\frac{2\pi}{N_2}ml\right)$$

where U[k,l,k',l',f] are the elements of a precoding matrix in the frequency domain. Several strategies can be considered:

Zero Forcing (ZF): the transmitter applies the inverse of the estimated channel response Ĥ[k,l,f] at each direction (k, l), where the subindex i has been removed because each beam can be unambiguously assigned to one and only one user 106: U[k,l,k',l',f]=Ĥ$^{-1}$[k,l,f]δ[l−l'], where δ[x]=1 if x=0, and δ[x]=0 otherwise.

Maximum Ratio Transmission (MRT): the transmitter applies the normalized conjugate of the estimated channel response:

$$U[k, l, k', l' f] = \frac{\hat{H}^*[k, l, f]}{\|\hat{H}\|} \delta[k - k']\delta[l - l'],$$

where Ĥ*[k,l,f] denotes the conjugate of the estimated channel coefficients at directions (k, l) in the frequency domain, and ‖Ĥ‖ is a norm defined as:

$$\|\hat{H}\| = \sqrt{\sum_{(k,l) \in \Phi} |\hat{H}[k, l, f]|^2}.$$

Other precoding strategies can also be devised aimed at tailoring the transmitted signals, e.g. for reducing inter-beam interference when the users' positions do not exactly match the grid positions (u, v), or for any other purpose.

It can be shown that ZF outperforms MRT in the high spectral efficiency regime, while MRT outperforms ZF for lower spectral efficiencies [9]. Application of one or the other approach may depend on the targeted scenarios, applications and also on implementation aspects.

When the transmitter has complete channel knowledge it will also be possible to apply power allocation strategies other than uniform powers for all the beams.

Figure 8:
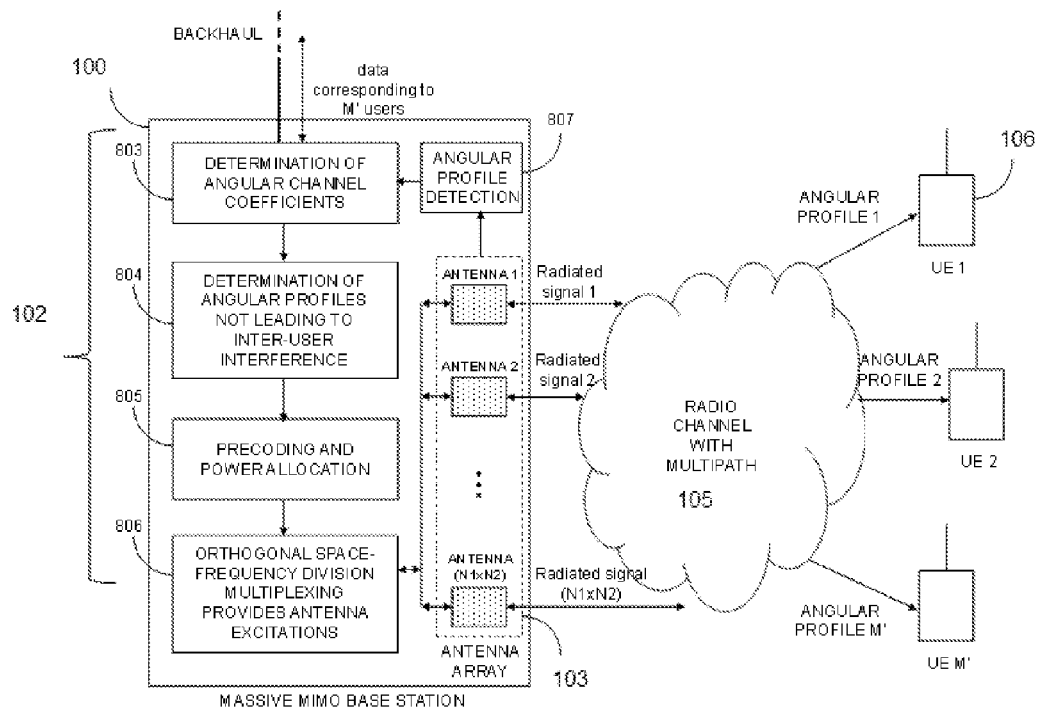
FIG. 8 is an exemplary embodiment of the proposed method when the base station has complete knowledge of the channel coefficients.

With reference to FIG. 8, shown therein it is an exemplary embodiment where it is assumed that the base station 100 has complete knowledge of the downlink channel coefficients (e.g. in TDD mode, exploiting channel reciprocity). A base station 100 is willing to transmit a number M' of data signals to M' users 106 through a multipath radio channel 105. Through direct analysis of the uplink signals, the base station 100 via the space-frequency processing technique 102 can perform angular profile detection 807 as well as determination of the angular channel coefficients, 803. New angular profiles not leading to inter-user interference are further obtained 804, and from them suitable precoding and power allocation strategies can be performed 805. Finally, orthogonal space-frequency division multiplexing 806 provides the antenna excitations to the antenna array 103 that delivers a total of M orthogonal beams and M' intended signals to the users 106, with ideally no inter-user interference and with maximized SNR.

Figure 9:
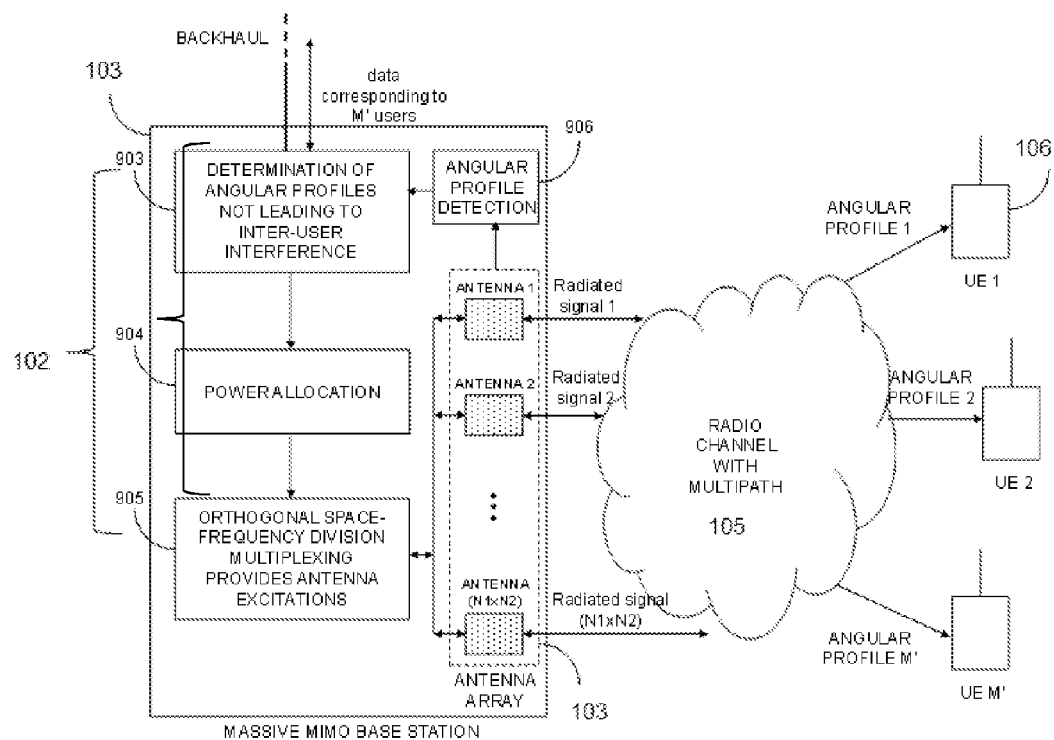
FIG. 9 is an exemplary embodiment of the proposed method when the base station does not have complete knowledge of the channel coefficients.

With reference to FIG. 9, shown therein it is an exemplary embodiment where it is assumed that the base station 100 has no knowledge of the downlink channel coefficients (e.g. in FDD mode). The base station 100 is willing to transmit a number M' of signals to M' users 106 through a wireless multipath channel 105. Analysis, via the space-frequency processing technique 102, of the uplink signals allows obtaining the angular profile characterizing the users 906, and with this information it is possible to determine new angular profiles not leading to inter-user interference, 903. Power allocation is then performed 904, and orthogonal space-frequency division multiplexing provides the antenna excitations 905 to the antenna array 103. Users 106 will receive their signals with no inter-user interference, although SNR cannot be maximized because of the absence of channel information at the transmit side.

The invention can be implemented as a collection of software elements, hardware elements, firmware elements, or any suitable combinations of them. That is, the method according to the present invention is suitable for implementation with aid of processing means, such as computers and/or processors. Therefore, there is provided a computer program, comprising instructions arranged to cause the processing means, processor, or computer to perform the steps of any of the claims of the proposed methods. The computer program preferably comprises program code which is stored on a computer readable medium (not illustrated), which can be loaded and executed by a processing means, processor, or computer (not illustrated also) to cause it to perform the methods.

The scope of the invention is defined in the following set of claims.

The invention claimed is:

1. A method for performing multiple access in wireless OFDM cellular systems over multipath wireless channels considering both space and frequency domains, wherein at least one base station equipped with a large number of antennas according to a two-dimensional rectangular array has complete knowledge of the channel characteristics between it and each one of a number M' of cell users, said rectangular array comprising $N_1$ antenna elements along one axis with a regular spacing $d_x$ and $N_2$ antenna elements along a perpendicular axis with a regular spacing $d_y$, and each one of said users being characterized by angles (θ,φ) in a spherical coordinate system discretized through a grid spacing (Δu,Δv) in the (u, v) domain to achieve orthogonality by letting u=sin(θ)cos(φ), v=sin(θ)sin(φ), $d_x$=λ/($N_1$Δu), $d_y$=λ/($N_2$Δv), $u_k$=k·Δu and $v_l$=l·Δv, for k=0,1, . . . , $N_1$−1, l=0, 1, . . . , $N_2$−1, the method characterized in that the at least one base station comprises performing following steps:

obtaining, from known training or pilot signals transmitted by each one of the users, signals in the (u, v) domain by means of:

$$S_R[k, l, f] = \frac{1}{\sqrt{N_c N_1 N_2}} \sum_{r=0}^{N_c-1} \sum_{n=0}^{N_1-1} \sum_{m=0}^{N_2-1} A_R[n, m, t] \exp\left(-j\frac{2\pi}{N_c}ft\right) \exp\left(j\frac{2\pi}{N_1}nk\right) \exp\left(j\frac{2\pi}{N_2}ml\right)$$

where $A_R[n,m,t]$ denotes the time-domain signal received by antenna element (n, m), $N_c$ denotes the number of subcarriers in the frequency domain, and $S_R[k,l,f]$ denotes the frequency components of the received beam in (k, l) direction;

estimating angular channel coefficients corresponding to each one of the users by means of using the following equation:

$$S_R[k,l,f]=H_i[k,l,f]\cdot\text{Pilot}_i[f]+N,$$

where $\text{Pilot}_i[f]$ denotes the a-priori known pilot/training signals transmitted by user i, $H_i[k,l,f]$ is the channel frequency response associated with user i in the direction (k, l), and N is a complex additive noise component;

estimating an angular profile $\phi_i$ characterizing each on of the users, said angular profile $\phi_i$ comprising a set of directions, or beams, (k, l) in the (u, v) domain for which the estimated angular channel coefficients $\hat{H}_i[k,l,f]$ are not zero:

$$\phi_i=\{(k_j,l_j), \forall j=0,\ldots,N_1N_2-1 \text{ such that } \hat{H}_i[k,l,f]\neq 0\};$$

discarding, from said estimated angular profiles $\phi_i$, those beams belonging to two or more different angular profiles as they would cause inter-user interference, thereby leading to new angular profiles $\tilde{\phi}_i$ given by:

$$\tilde{\phi}_i=\{(k_j,l_j)\in\phi_i:(k_j,l_j)\notin\phi_{i'}\forall i'\neq i\}, i=0,\ldots,M''-1,$$

where M" denotes the number of different angular profiles after excluding beams causing inter-user interference, which coincides with a number of simultaneously addressable users;

allocating powers to each of the beams contained in said angular profiles $\tilde{\phi}_i$, in such a way that the sun of powers of the beams in an angular profile of the angular profiles $\tilde{\phi}_i$ does not exceed a power allocated to the corresponding user; and calculating excitation coefficients for each one of said large number of antennas by means of:

$$A_T[n,m,f] = \sqrt{\frac{1}{N_1N_2}} \sum_{(k,l)\in\tilde{\Phi}} P_T[k,l] \cdot \left( \sum_{(k',l')\in\Phi} U[k,l,k',l',f]S_T[k',l',f] \right) \times$$

$$\exp\left(-j\frac{2\pi}{N_1}nk\right)\exp\left(-j\frac{2\pi}{N_2}ml\right)$$

where $A_T[n,m,f]$ is the excitation coefficient of antenna (n, m) in the frequency domain, U[k,l,k',l',f] are the elements of a precoding matrix in the frequency domain of a direction (k,l) and a multipath direction (k',l'), $P_T[k,l]$ is the transmit power allocated to the beam in the direction (k,l) in the frequency domain, and $\Phi$ denotes a superposition of the angular profiles of all the users with a number of elements or beams, given by $$M \geq M'': \Phi \equiv \bigcup_{i=0}^{M''-1} \tilde{\Phi}_i.$$

2. The method of claim 1, wherein the precoding matrix is obtained by means of:

$$U[k,l,k',l',f]=\hat{H}^{-1}[k,l,f]\delta[k-k']\delta[l-l'],$$

where $\hat{H}^{-1}[k,l,f]$ denotes the inverse of the estimated angular channel coefficients at directions (k,l) in the frequency domain, and $\delta[x]=1$ if $x=0$, $\delta[x]=0$ otherwise.

3. The method of claim 1, wherein the precoding matrix is obtained by means of:

$$U[k,l,k',l',f] = \frac{\hat{H}^*[k,l,f]}{\|\hat{H}\|}\delta[k-k']\delta[l-l'],$$

where $\hat{H}^*[k,l,f]$ denotes the conjugate of estimated channel coefficients $\hat{H}$ at directions (k,l) in the frequency domain, and $\|\hat{H}\|$ is a norm defined by:

$$\|\hat{H}\| = \sqrt{\sum_{k,l\in\Phi} |\hat{H}[k,l,f]|^2}.$$

4. The method of claim 1, wherein the transmit power allocated to the beam in direction (k,l) is given by:

$$P_T[k,l] = \frac{P_{T,i}}{N_{\Phi,i}}, \forall (k,l) \in \tilde{\Phi}_i, i=0,\ldots,M''-1,$$

where $N_{\phi,i}$ is the number of elements contained in $\tilde{\phi}_i$ and $P_{T,i}$ allocated to user i.

5. The method of claim 1, wherein the transmit power allocated to the beam in direction (k,l) is given by:

$$P_T[k,l] = \frac{P_R[k,l]}{\sum_{(k,l)\in\tilde{\Phi}_i} P_R[k,l]} P_{T,i}, \forall (k,l) \in \tilde{\Phi}_i, i=0,\ldots,M''-1,$$

where $P_R[k,l]$ denotes the power associated with beam (k,l) as received by the user, and $P_{T,i}$ is the power allocated to user i.

6. The method of claim 1, wherein the transmit power allocated to the beam in direction (k,l) is given by:

$$P_T[k,l] = \frac{P_R^{-1}[k,l]}{\sum_{(k,l)\in\tilde{\Phi}_i} P_R^{-1}[k,l]} P_{T,i}, \forall (k,l) \in \tilde{\Phi}_i, i=0,\ldots,M''-1,$$

where $P_R[k,l]$ denotes the power associated with beam (k,l) as received by the user, and $P_{T,i}$ is the power allocated to user i.

7. The method of claim 1, wherein the estimation of the angular channel coefficients is given by the following expression:

$$\hat{H}_i[k,l,f] = \frac{\text{Pilot}_i[f]}{|\text{Pilot}_i[f]|^2 + 1/SNR} \times$$

$$\frac{1}{\sqrt{N_1N_2}} \sum_{n=0}^{N_1-1}\sum_{m=0}^{N_2-1} A_R[n,m,f]\exp\left(j\frac{2\pi}{N_1}nk\right)\exp\left(j\frac{2\pi}{N_2}ml\right)$$

where SNR is a signal-to-noise ratio, Pilot$_i$[f] is the a-priori known pilot signal transmitted by user i, and A$_R$[n,m,f] denotes the frequency-domain signal received by antenna element (n,m):

$$A_R[n, m, f] = \frac{1}{\sqrt{N_c}} \sum_{t=0}^{N_c-1} A_R[n, m, t] \exp\left(-j\frac{2\pi}{N_c}ft\right).$$

8. A method for performing multiple access in wireless OFDM cellular systems over multipath wireless channels considering both space and frequency domains, wherein at least one base station equipped with a large number of antennas according to a two-dimensional rectangular array has no information on the channel characteristics between it and each one of a number M' of cell users, said rectangular array comprising N$_1$ antenna elements along one axis with a regular spacing d$_x$ and N$_2$ antenna elements along a perpendicular axis with a regular spacing d$_y$, and each one of said users being characterized by angles (θ,φ) in a spherical coordinate system discretized through a grid sparing (Δu,Δv) in the (u, v) domain to achieve orthogonality by letting u=sin(θ)cos(φ), v=sin(θ)sin(φ), d$_x$=λ/(N$_1$Δu), d$_y$=λ/(N$_2$Δv), u$_k$=k·Δu and v$_l$=l·Δv, for k=0,1, . . . , N$_1$−1, l=0,1, . . . , N$_2$−1, the method being characterized in that the at least one base station comprises performing following steps:

obtaining, from known training or pilot signals transmitted by each one of the users, signals in the (u, v) domain by means of:

$$S_R[k, l, f] = \frac{1}{\sqrt{N_c N_1 N_2}} \sum_{t=0}^{N_c-1} \sum_{n=0}^{N_1-1} \sum_{m=0}^{N_2-1} A_R[n, m, t]\exp\left(-j\frac{2\pi}{N_c}ft\right)\exp\left(j\frac{2\pi}{N_1}nk\right)\exp\left(j\frac{2\pi}{N_2}ml\right),$$

where A$_R$[n,m,t] denotes the time-domain signal received by antenna element (n, m), N$_c$ denotes the number of subcarriers in the frequency domain, and S$_R$[k,l,f] denotes the frequency components of the received beam in (k, l) direction;

estimating an angular profile φ$_i$ characterizing each one of the users, said angular profile φ$_i$ comprising a set of directions, or beams, (k, l) in the (u, v) domain for which received powers from each one of the users are not zero:

φ$_i$={(k$_j$,l$_j$), ∀j=0, . . . , N$_1$N$_2$−1 such that non-null signal is received by user i};

discarding, from said estimated angular profiles φ$_i$, those beams belonging to two or more different angular profiles as they would cause inter-user interference, thereby leading to new angular profiles $\tilde{φ}_i$ given by:

$\tilde{φ}_i$={(k$_j$, l$_j$)∈φ$_i$:(k$_j$,l$_j$)∉φ$_{i'}$∀i'≠i},i=0, . . . , M''−1, where M'' denotes the number of different angular profiles after excluding beams causing inter-user interference, which coincides with a number of simultaneously addressable users;

allocating powers to each of the beams in an angular profile of the angular profiles $\tilde{φ}_i$, in such a way that the sum of powers of the beams in an angular profile of the angular profiles $\tilde{φ}_i$ does not exceed a power allocated to the corresponding user; and calculating excitation coefficients for each one of said large number of antennas by means of:

$$A_T[n, m, f] = \sqrt{\frac{1}{N_1 N_2}} \sum_{(k,l)\in\tilde{\Phi}} P_T[k, l] \cdot S_T[k, l, f]\exp\left(-j\frac{2\pi}{N_1}nk\right)\exp\left(-j\frac{2\pi}{N_2}ml\right)$$

where A$_T$[n,m,f] is the excitation coefficient of antenna (n, m) in the frequency domain, P$_T$[k,l] is the transmit power allocated to the beam in the direction (k, l), S$_T$[k,l,f] is the data corresponding to the direction (k,l) in the frequency domain, and $\tilde{\Phi}$ denotes a superposition of the angular profiles of all the users with a number of elements or beams, given by $$M \geq M'' : \tilde{\Phi} \equiv \bigcup_{i=0}^{M''-1} \tilde{\Phi}_i.$$

9. The method of claim 8, wherein the transmit power allocated to user i is given by:

$$P_T[k, l] = \frac{P_{T,i}}{N_{\Phi,i}}, \forall (k, l) \in \tilde{\Phi}_i, i = 0, \ldots, M'' - 1,$$

where N$_{φ,i}$ is the number of elements contained in $\tilde{φ}_i$ and P$_{T,i}$ is the power allocated to user i.

10. The method of claim 1, wherein signals intended for directions (k,l) in the (u,v) domain are equal to signals intended for the user characterized by the angular profile $\tilde{φ}_i$ which contains that direction:

S$_T$[k,l,f]=S$_i$[f];∀(k,l)∈$\tilde{φ}_i$,i =0,1, . . . , M'−1.

where S$_i$[f] is the signal for user i in the frequency domain.

11. The method of claim 1, wherein operating frequencies for uplink and downlink directions are different, and the angles (θ,φ) are discretized by means of different grids (Δu,Δv) in uplink and downlink, according to the expressions:

$$\Delta u_{UL} = \frac{\lambda_{UL}}{d_x N_1}, \Delta u_{DL} = \frac{\lambda_{DL}}{d_x N_1}$$

$$\Delta v_{UL} = \frac{\lambda_{UL}}{d_x N_2}, \Delta v_{DL} = \frac{\lambda_{DL}}{d_y N_2}$$

where λ$_{UL}$ denotes the wavelength in uplink centre frequency, λ$_{DL}$ denotes the wavelength in downlink centre frequency, (Δu$_{UL}$,Δv$_{UL}$) is the grid in uplink and (Δu$_{DL}$, Δv$_{DL}$) is the grid in downlink.

12. A base station, comprising a large number of antennas according to a two-dimensional rectangular array and said base station being configured for performing multiple access in a wireless OFDM cellular system over a multipath wireless channel considering both space and frequency domains to a number M' of cell users, said two-dimensional rectangular array comprising N$_1$ antenna elements along one axis with a regular spacing d$_x$ and N$_2$ antenna elements along a perpendicular axis with a regular spacing d$_y$, and each one (UE1, UE2, . . . , UEM') of said users being characterized by angles (θ,φ) in a spherical coordinate system discretized through a grid spacing (Δu,Δv) in the (u, v) domain to achieve orthogonality by letting u=sin(θ)cos(φ), v=sin(θ)sin(φ), $d_x=\lambda/(N_1\Delta u)$, $d_y=\lambda/(N_2\Delta v)$, $u_k=k\cdot\Delta u$ and $v_l=l\cdot\Delta v$, for k=0,1, ..., $N_2$−1, characterized in that the base station includes:

a scheduler configured for receiving, from each one (UE1, UE2, ..., UEM') of the users known training or pilot signals, and for obtaining the received known training or pilot signals in the (u, v) domain by means of:

$$S_R[k,l,f] = \frac{1}{\sqrt{N_cN_1N_2}} \sum_{t=0}^{N_c-1}\sum_{n=0}^{N_1-1}\sum_{m=0}^{N_2-1} A_R[n,m,t]\exp\left(-j\frac{2\pi}{N_c}ft\right)\exp\left(j\frac{2\pi}{N_1}nk\right)\exp\left(j\frac{2\pi}{N_2}ml\right),$$

where $A_R[n,m,t]$ denotes the time-domain signal received by antenna element (n, m), $N_c$ denotes the number of subcarriers in the frequency domain, and $S_R[k,l,f]$ denotes the frequency components of the received beam in (k, l) direction; and a processor configured for:
    estimating an angular profile $\phi_i$ characterizing each one (UE1, UE2, ..., UEM') of the users,
  wherein if the base station has complete knowledge of the characteristics of the multipath wireless channel between it and each one (UE1, UE2, ..., UEM') of said users, said angular profile $\phi_i$ comprises a set of directions, or beams, (k,l) in the (u,v) domain for which angular coefficients $\hat{H}_i[k,l,f]$ previously estimated by the base station are not zero:

$\phi_i=\{(k_j,l_j), \forall j=0, \ldots, N_1N_2-1$ such that $\hat{H}_i[k,l,f]\neq 0\}$;
  or
wherein if the base station has no information of the characteristics of the multipath wireless channel between it and each one (UE1, UE2, ..., UEM') of said users, said angular profile $\phi_i$ comprises a set of directions or beams, (k,l) in the (u,v) domain for which received powers from each one of the users are not zero:

$\phi_i=\{(k_j,l_j), \forall j=0, \ldots, N_1N_2-1$ such that non-null signal is received by user $i\}$;

discarding from said estimated angular profiles $\phi_i$ those beams belonging to two or more different angular profiles as they would cause inter-user interference, thereby leading to new angular profiles $\tilde{\phi}_i$ given by:

$\tilde{\phi}_i=\{(k_j,l_j)\in\phi_i:(k_j,l_j)\notin\phi_{i'},\forall i'\neq i\},i=0,\ldots,M''-1$, where M'' denotes the number of different angular profiles after excluding beams causing inter-user interference, which coincides with a number of simultaneously addressable users;

allocating powers to each of the beams contained in said angular profiles $\tilde{\phi}_i$, in such a way that the sum of powers of the beams in an angular profile of the angular profiles $\tilde{\phi}_i$ does not exceed a power allocated to the corresponding user; and calculating excitation coefficients for each one of said large number of antennas, wherein if the base station has complete knowledge of the characteristics of the multipath wireless channel between it and each one (UE1, UE2, ..., UEM') of said users, by means of:

$$A_T[n,m,f] = \sqrt{\frac{1}{N_1N_2}} \sum_{(k,l)\in\Phi} P_T[k,l]\cdot\left(\sum_{(k',l')\in\Phi} U[k,l,k',l',f]S_T[k',l',f]\right)\times\exp\left(-j\frac{2\pi}{N_1}nk\right)\exp\left(-j\frac{2\pi}{N_2}ml\right)$$

where $A_T[n,m,f]$ is the excitation coefficient of antenna (n, m) in the frequency domain, $U[k,l,k',l',f]$ are the elements of a precoding matrix in the frequency domain of a direction (k,l) and a multipath direction (k',l'), $P_T[k,l]$ is the transmit power allocated to the beam in the direction (k,l), $S_T[k,l,f]$ is the data corresponding to the direction (k,l) in the frequency domain, and $\phi$ denotes a superposition of the angular profiles of all the users with a number of elements, or beams given by $$M \geq M'' : \Phi \equiv \bigcup_{i=0}^{M''-1} \tilde{\Phi}_i;$$

or wherein if the base station has no information of the characteristics of the multipath wireless channel between it and each one (UE1, UE2, ..., UEM') of said users, the calculation of the excitation coefficients is by means of:

$$A_T[n,m,f] = \sqrt{\frac{1}{N_1N_2}} \sum_{(k,l)\in\Phi} P_T[k,l]\cdot S_T[k,l,f]\exp\left(-j\frac{2\pi}{N_1}nk\right)\exp\left(-j\frac{2\pi}{N_2}ml\right)$$

where $A_T[n,m,f]$ is the excitation coefficient of antenna (n, m) in the frequency domain, $P_T[k,l]$ is the transmit power allocated to the beam in the direction (k, l), $S_T[k,l,f]$ is the data corresponding to the direction (k, l) in the frequency domain, and $\phi$ denotes the superposition of the angular profiles of all the users with a number of elements, or beams, given by $$M \geq M'' : \Phi \equiv \bigcup_{i=0}^{M''-1} \tilde{\Phi}_i.$$

13. The base station of claim 12, wherein said angular coefficients $\hat{H}_i[k,l,f]$, which are not zero, are estimated, by the base station having complete knowledge of the characteristics of the multipath wireless channel, by means of the equation:

$S_R[k,l,f]=H_i[k,l,f]\cdot\text{Pilot}_i[f]+N$, where $\text{Pilot}_i[f]$ denotes the a-priori known pilot/training signals transmitted by user i, $H_i[k,l,f]$ is the channel frequency response associated with user i in the direction (k, l), and N is a complex additive noise component.

14. A non-transitory computer readable medium comprising program code instructions which when loaded into a computer system controls the computer system to perform the method of claim 1.

* * * * *